US011514089B2

(12) United States Patent
Ascough et al.

(10) Patent No.: US 11,514,089 B2
(45) Date of Patent: Nov. 29, 2022

(54) GEOSPATIAL MONITORING SYSTEM PROVIDING UNSUPERVISED SITE IDENTIFICATION AND CLASSIFICATION FROM CROWD-SOURCED MOBILE DATA (CSMD) AND RELATED METHODS

(71) Applicant: EAGLE TECHNOLOGY, LLC, Melbourne, FL (US)

(72) Inventors: Jessica L. Ascough, Melbourne, FL (US); Bernard V. Brower, Rochester, NY (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 808 days.

(21) Appl. No.: 16/385,097

(22) Filed: Apr. 16, 2019

(65) Prior Publication Data
US 2020/0334278 A1  Oct. 22, 2020

(51) Int. Cl.
*G06F 16/28* (2019.01)
*G06F 16/29* (2019.01)
*G06N 3/04* (2006.01)
*G06N 3/08* (2006.01)

(52) U.S. Cl.
CPC ............ *G06F 16/29* (2019.01); *G06F 16/285* (2019.01); *G06N 3/04* (2013.01); *G06N 3/08* (2013.01)

(58) Field of Classification Search
CPC ........ G06N 3/02; G06N 20/00; G06N 3/0472; G06N 3/088; G06N 3/04; G06N 3/0454; G06F 19/00; G06F 16/245; G06F 16/3331; G06F 16/285; G06F 16/29; G06K 9/6228

USPC .......... 340/286.02, 686.6; 700/1, 9; 702/85, 702/152, 155; 703/2; 706/1; 707/737–738, 740, E17.089
See application file for complete search history.

(56) References Cited

U.S. PATENT DOCUMENTS

| 8,274,377 B2 * | 9/2012 | Smith ................. G08B 25/009 340/506 |
| 9,092,802 B1 * | 7/2015 | Akella ................. G06F 40/242 |
| 11,184,766 B1 * | 11/2021 | Lord ................. G06V 40/1365 |

(Continued)

OTHER PUBLICATIONS

Sprint et al. "Unsupervised detection and analysis of changes in everyday physical activity data" J Biomed Inform. Oct. 2016;63:54-65. doi: 10.1016/j.jbi.2016.07.020. Epub Jul. 25, 2016. Abstract Only.

(Continued)

*Primary Examiner* — Jeffrey P Aiello
(74) *Attorney, Agent, or Firm* — Allen, Dyer, Doppelt + Gilchrist, P.A. Attorneys at Law

(57) ABSTRACT

A geospatial monitoring system may include a memory and a processor cooperating with the memory to obtain crowd-sourced mobile data (CSMD) for a geographic region, identify a plurality of geospatial sites within the geographic region based upon the CSMD, and determine a classification of each of the plurality of geospatial sites based upon the CSMD. The processor may further determine a pattern-of-life normalcy model for each of the geospatial sites based upon a respective classification, determine an abnormality in a respective pattern-of-life normalcy model at a given geospatial site based upon the CSMD, and initiate additional monitoring for the given geospatial site having the abnormality.

17 Claims, 11 Drawing Sheets

(56) References Cited

U.S. PATENT DOCUMENTS

| | | | | |
|---|---|---|---|---|
| 2009/0195401 | A1* | 8/2009 | Maroney | G06V 20/52 |
| | | | | 340/686.6 |
| 2012/0197896 | A1* | 8/2012 | Li | H04L 29/08072 |
| | | | | 707/E17.089 |
| 2014/0096249 | A1* | 4/2014 | Dupont | G06F 21/00 |
| | | | | 726/23 |
| 2016/0173963 | A1* | 6/2016 | Filson | G08B 21/18 |
| | | | | 340/870.09 |
| 2016/0379388 | A1* | 12/2016 | Rasco | G06N 5/003 |
| | | | | 715/753 |
| 2017/0234691 | A1* | 8/2017 | Abramson | G01C 21/3453 |
| | | | | 701/442 |
| 2018/0191867 | A1* | 7/2018 | Siebel | G06F 8/35 |
| 2018/0206136 | A1* | 7/2018 | Chow | H04L 43/50 |
| 2019/0212977 | A1* | 7/2019 | Sicurelli, III | G06N 20/00 |
| 2019/0306722 | A1* | 10/2019 | Yoon | H04W 24/10 |

OTHER PUBLICATIONS

Jessica Lynn Ascough "Patterns of Life Assisted Geospatial Facility Monitoring" 2018; pp. 68.

Thakur et al. "PlanetSense: A Platform for Gathering Real-time Geo-spatial Intelligence from Crowdsourced and Social Media Data" https://udl.oml.gov/content/planetsense-platform-gathering-real-time-geo-spatial-intelligence-crowdsourced-and-social; retreived from Internet Feb. 26, 2019; pp. 1.

Biltgen et al. "Activity Based Intelligence: Understanding Patters of Life" United States Geospatial Intelligence Foundation: 2017; pp. 7.

* cited by examiner

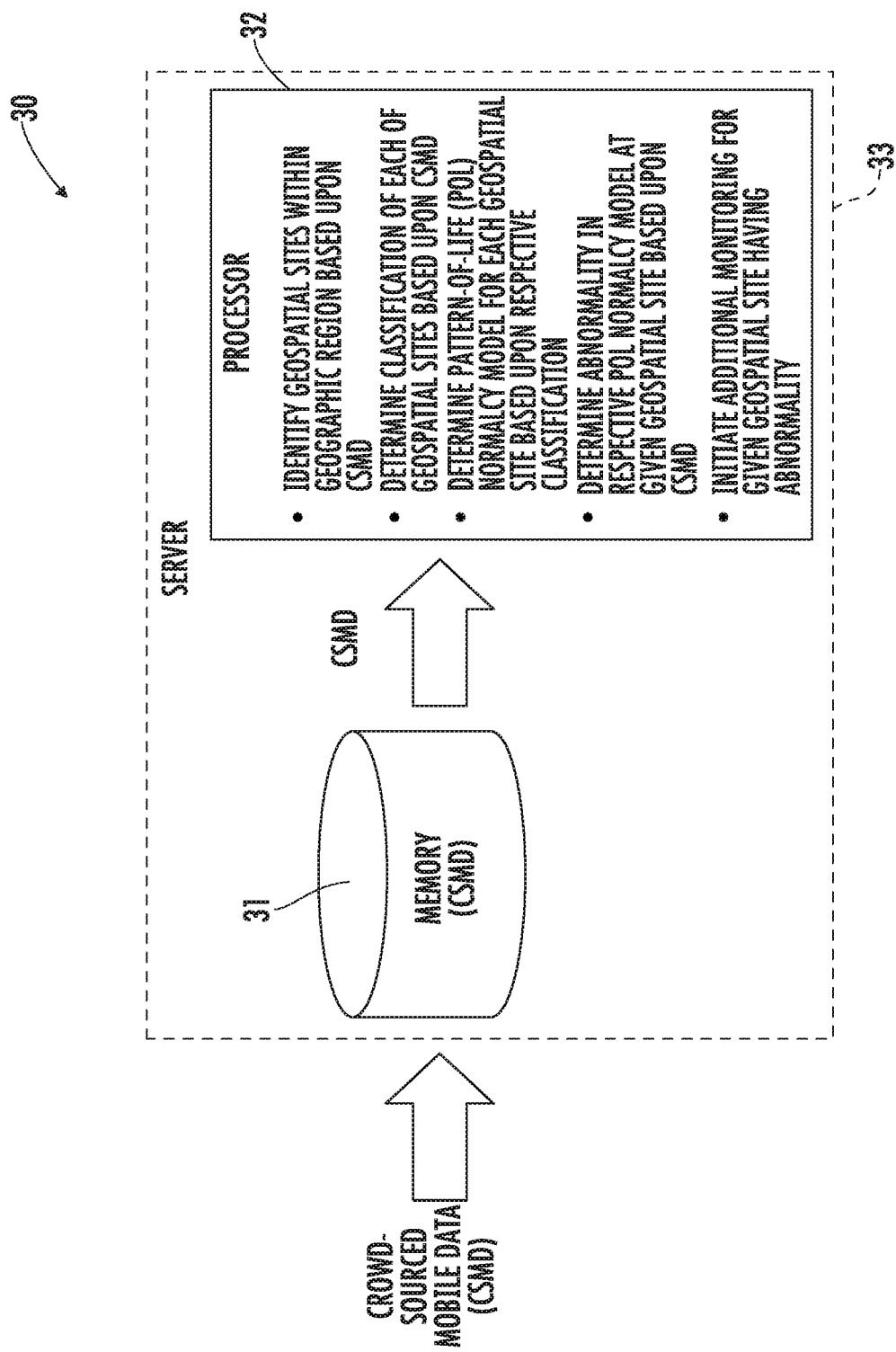

GEOSPATIAL MONITORING SYSTEM PROVIDING UNSUPERVISED SITE IDENTIFICATION AND CLASSIFICATION FROM CROWD-SOURCED MOBILE DATA (CSMD) AND RELATED METHODS

TECHNICAL FIELD

The present invention relates to the field of geospatial monitoring systems, and, more particularly, to systems for determining sites of interest from crowd-sourced data and related methods.

BACKGROUND

Pattern-of-life (POL) analysis is a surveillance approach used for understanding a subject's behavior or habits. POL data harvesting allows for advanced predictive analytical techniques that may provide fusion with geospatial data for facility monitoring (FM) identification, classification, and anomaly detection (AD). To detect POLs, persistent surveillance techniques may be used such as: collecting imagery over a given location over a given time; collecting data on a given location or facility over a given time; or watching an area 24/7 with motion imagery, for example.

One of the recent developments in persistent surveillance is wide-area motion imagery (WAMI). WAMI applications include both situational awareness (real time) and forensic analysis (after the fact). WAMI systems can deliver 24/7 aerial coverage of a specific region of interest (ROI). Moreover, persistent surveillance is useful for many commercial applications.

U.S. Pat. Pub. No. 2009/0195401 to Maroney et al. discloses a sensor system and a method used to track the behaviors of targets in an area under surveillance. A sensor array is located in the area that is capable of sending messages to a user when behavior of a tracked target is determined to be anomalous. In making the determination of anomalous behavior, the sensor system and method may generate and continuously refine a pattern of life model that may examine, for example, the paths a target may take within the sensor array and the end points of the paths taken. The sensor system and method may also incorporate any user defined conditions for anomalous behavior.

Despite the existence of such configurations, further enhancements to surveillance systems may be desirable in certain applications.

SUMMARY

A geospatial monitoring system may include a memory and a processor cooperating with the memory to obtain crowd-sourced mobile data (CSMD) for a geographic region, identify a plurality of geospatial sites within the geographic region based upon the CSMD, and determine a classification of each of the plurality of geospatial sites based upon the CSMD. The processor may further determine a pattern-of-life normalcy model for each of the geospatial sites based upon a respective classification, determine an abnormality in a respective pattern-of-life normalcy model at a given geospatial site based upon the CSMD, and initiate additional monitoring for the given geospatial site having the abnormality.

More particularly, the processor may identify the plurality of geospatial sites without training data. Furthermore, the processor may determine the classification of each of the plurality of geospatial sites based upon an unsupervised partitioning algorithm.

In an example embodiment, the processor may determine the classification of each of the plurality of geospatial sites based upon trip observations associated with the CSMD. Furthermore, the processor may be configured to identify the geospatial sites within the geographic region based upon unsupervised density based geospatial clustering of CSMD data points, and unsupervised geometric boundary generation for respective clustered data points, for example. Moreover, the processor may also be configured to selectively perform unsupervised geometry boundary division for geospatial sites having different types of CSMD data points therein in an example implementation.

By way of example, the processor may determine the plurality of geospatial sites within the geographic region based upon a hierarchical density-based spatial clustering of applications with noise (HDMSCAN) algorithm. Also by way of example, the CSMD may include at least one of social media data points, fleet vehicle data points, mobile phone data points, and connected vehicle data points. The processor may also be configured to determine the classification of each of the geospatial sites based upon deep learning.

A related geospatial monitoring method may include obtaining crowd-sourced mobile data (CSMD) for a geographic region at a server, identifying a plurality of geospatial sites within the geographic region based upon the CSMD at the server, and determining a classification of each of the plurality of geospatial sites at the server based upon the CSMD. The method may further include determining a pattern-of-life normalcy model for each of the geospatial sites at the server based upon a respective classification, determining an abnormality in a respective pattern-of-life normalcy model at a given geospatial site at the server based upon the CSMD, and initiating additional monitoring at the server for the given geospatial site having the abnormality.

A related non-transitory computer-readable medium may have computer-executable instructions for causing a computer to perform steps including obtaining crowd-sourced mobile data (CSMD) for a geographic region, identifying a plurality of geospatial sites within the geographic region based upon the CSMD, and determining a classification of each of the plurality of geospatial sites based upon the CSMD. The steps may further include determining a pattern-of-life normalcy model for each of the geospatial sites based upon a respective classification, determining an abnormality in a respective pattern-of-life normalcy model at a given geospatial site based upon the CSMD, and initiating additional monitoring for the given geospatial site having the abnormality.

BRIEF DESCRIPTION OF THE DRAWINGS

FIG. 1 is a schematic block diagram of a geospatial monitoring system in accordance with an example embodiment.

DETAILED DESCRIPTION

Figure 2A:
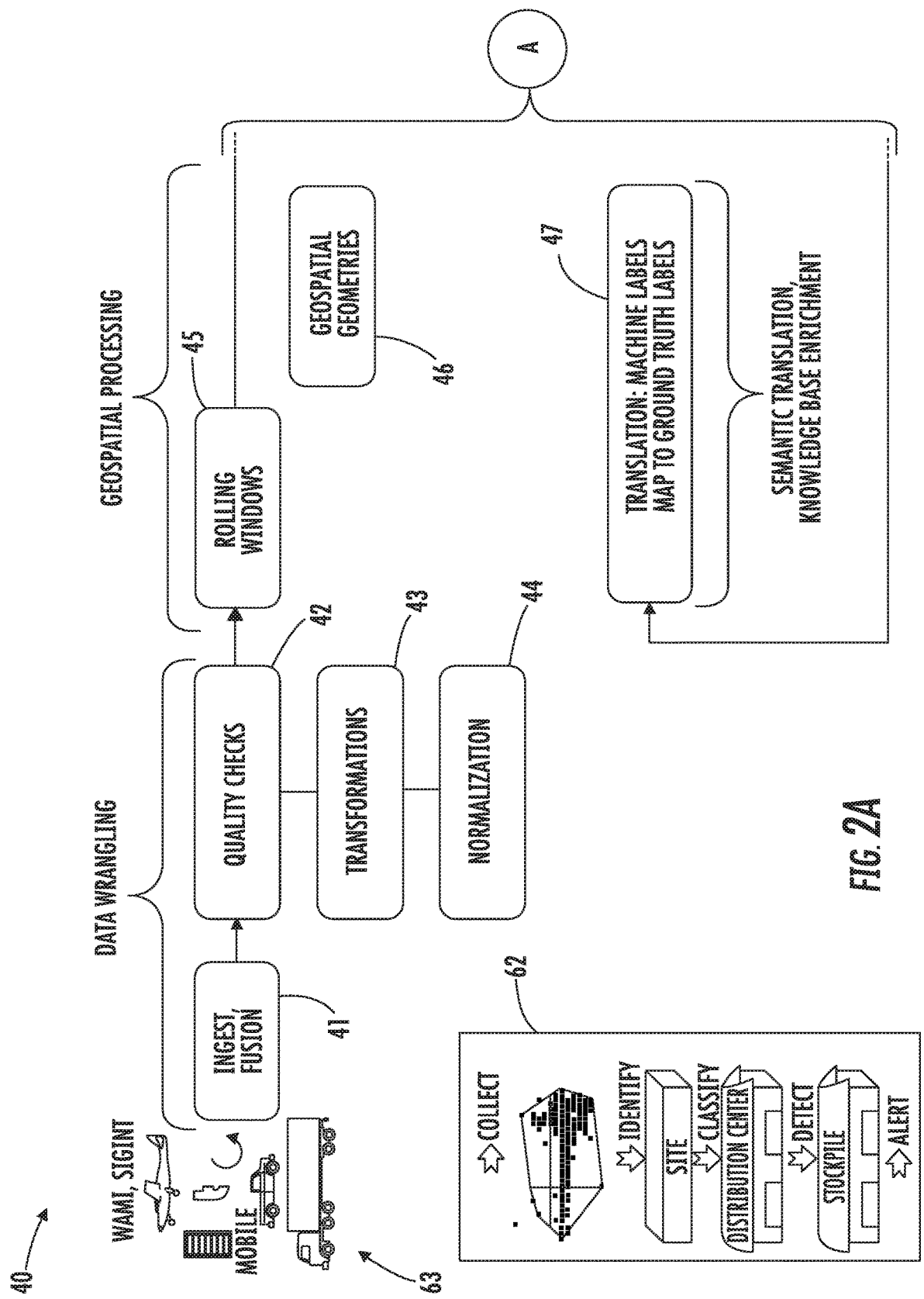
FIGS. 2A and 2B are a schematic block diagram illustrating a processing chain performed by the system of FIG. 1 in accordance with an example implementation.

The present description is made with reference to the accompanying drawings, in which example embodiments are shown. However, many different embodiments may be used, and thus the description should not be construed as limited to the particular embodiments set forth herein. Like numbers refer to like elements throughout.

By way of background, while various platforms exist to collect wide-area motion imagery (WAMI) data in virtually any geospatial region, the cost and time-window constraints of unmanned aerial vehicles (UAVs) and satellites, respectively, may leave an analysis gap devoid of data between collections. Additionally, weather, availability, fly zones, daylight, and cloud coverage can delay or prevent WAMI collection at certain times. Furthermore, such data is dependent upon the time at which it is taken, and may have large historical gaps between collection cycles.

Generally speaking, the approach described herein advantageously provides for pattern-of-life (POL) assisted geospatial fusion that supplements or even replaces WAMI surveillance collection platforms. Generally speaking, this is done by identifying facilities and creating respective normalcy models for these facilities that provide a truth baseline for concentration of limited WAMI resources.

Referring initially to FIG. 1, a geospatial monitoring system 30 illustratively includes a memory 31 and a processor 32, one or both of which may be associated with a server 33 or other computing device. The processor 32 cooperates with the memory 31 to obtain crowd-sourced mobile data (CSMD) for a geographic region, identify a plurality of geospatial sites within the geographic region based upon the CSMD, and determine a classification of each of the plurality of geospatial sites based upon the CSMD. The processor 32 may further determine a pattern-of-life normalcy model for each of the plurality of geospatial sites based upon a respective classification, determine an abnormality in a respective pattern-of-life normalcy model at a given geospatial site based upon the CSMD, and initiate additional monitoring for the given geospatial site having the abnormality, as will be discussed further below.

In an example implementation, the system 30 may advantageously utilize Multi-Intelligence (MULTI_INT) data sources to create, and accelerate the production of, activity-based intelligence (ABI) which may be used to identify and characterize facilities based on the activity as a function of time and day. Geospatial intelligence (GEO-INT) data and CSMD (e.g., fleet vehicle data, Internet of Things (IoT) sensor data, connected vehicle data, social media data, etc.) may be fused via unsupervised machine learning techniques and/or artificial intelligence (AI) to enable and automate cost-effective accelerated facility identification, characterization, and monitoring with increased accuracy, as compared to WAMI and FMV data collections alone (see FIG. 5). This technique may advantageously result in the rapid construction of Normalcy Models (NM), built to accurately describe the typical behavior of specific facilities or locations over time to allow for feature and anomaly detection, and advantageously empowering pro-active decision-making versus reactive forensic analysis. It should be noted that while the examples herein related to vehicle CSMD, "CSMD" as used herein is intended to encompass crowd-sourced mobile data from various types of devices or sensors that have an IP address and are connected to a wired, wireless, Wi-Fi, satellite, cell, or other network, including Internet of Things (e.g., smart/fitness watches, refrigerators, air conditioners, etc.) devices.

The definition of "normal" may vary for different facilities assigned to a particular site classification type. For instance, a specific building designated as a distribution center servicing locally on weekdays may have a secondary feature of below average speed limits for delivery trucks. As an analogy, normal blood pressure (BP) is defined as below 120/80 mmHg, although individuals with "normal" blood pressure may also have their own signature normal BP. The system 30 may advantageously address the secondary traits of specific sites that describe what is normal for them, as well as what is normal for their respective site classification grouping. Normalcy models including primary and secondary characteristics derived from entity membership POLs may expose a finer-grained understanding of standard operating behavior for facility monitoring and change detection.

WAMI and full motion video (FMV) collections may be analogous to seismic surveys, where the cost-limiting frequency of truth baseline collections require other data harvesting techniques for augmentation. CSMD may provide continuous coverage and may be fused, at opportune variable time intervals, for course-correction with the WAMI and FMV, as will be discussed further below.

Figure 10:
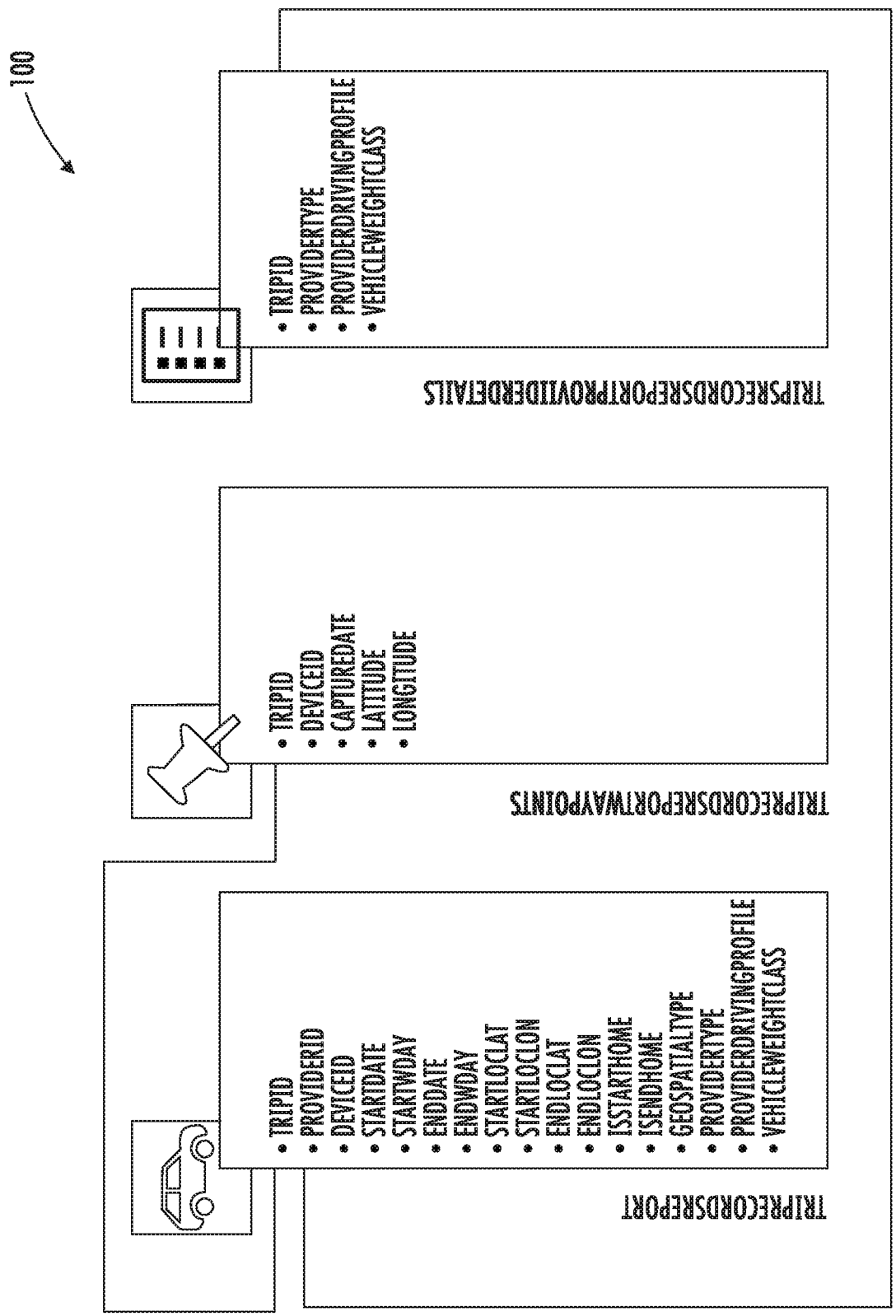
FIG. 10 is a diagram illustrating different CSMD parameters which may be used in an example implementation of the system of FIG. 1.

In one example implementation, CSMD may be defined as human and vehicle connectivity via mobile devices and vehicle probes respectively, that may be used for studying the movement of objects and entities. In many instances, CSMD may be non-attributable, meaning the actual entities tracked are anonymous, although in some applications attributed CSMD may be used. CSMD may be a continuous 24-hour by 7-day collection in real-time, or smaller intervals as desired, and may be obtained in real or near-real time, or collected and stored in increments (e.g., one or more weeks' worth of data) for processing at a later time. One example CSMD schema which may be used by the system 30 is shown in the graph 100 of FIG. 10. In this example implementation, three files are created from the as CSMD data collection: 1) Provider Details 2) Waypoints 3) Trip Report. Other types and organization of CSMD data may be used in different implementations.

In many instances, CSMD data may be procured from a service provider who obtains third party data from various sources. A provider may collect data relating to consumers (private individual), fleets (private or public business), or mobile devices, for example. With respect to vehicles, CSMD may come from a private consumer or from a service vehicle such as a taxi, field service, long distance trucking fleet, or local delivery fleet. Weight class identifies the type of vehicle.

Figure 3:
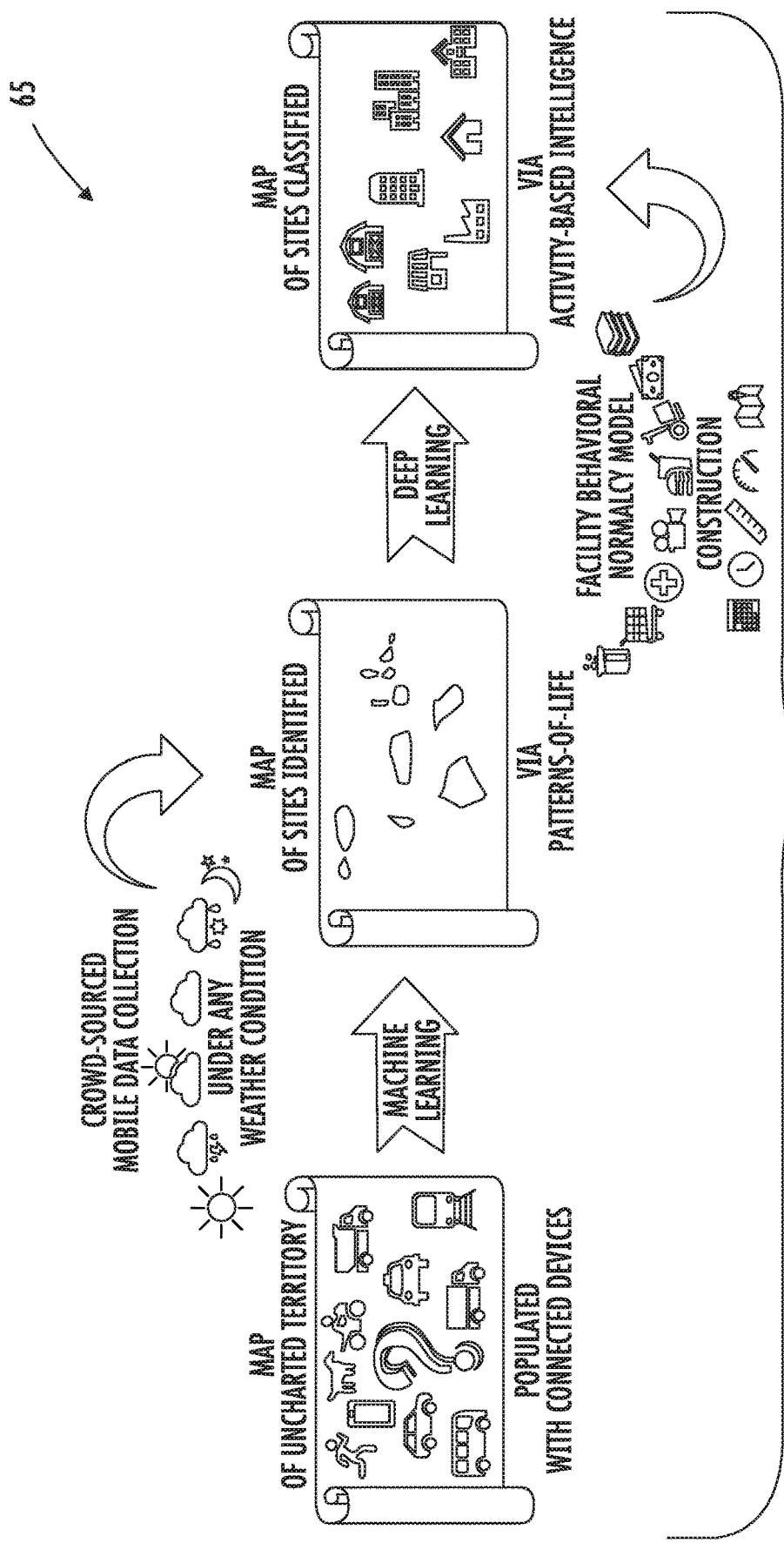
FIGS. 3 and 4 are flow diagrams illustrating site identification and classification operations in example implementations of the system of FIG. 1.
Figure 4:
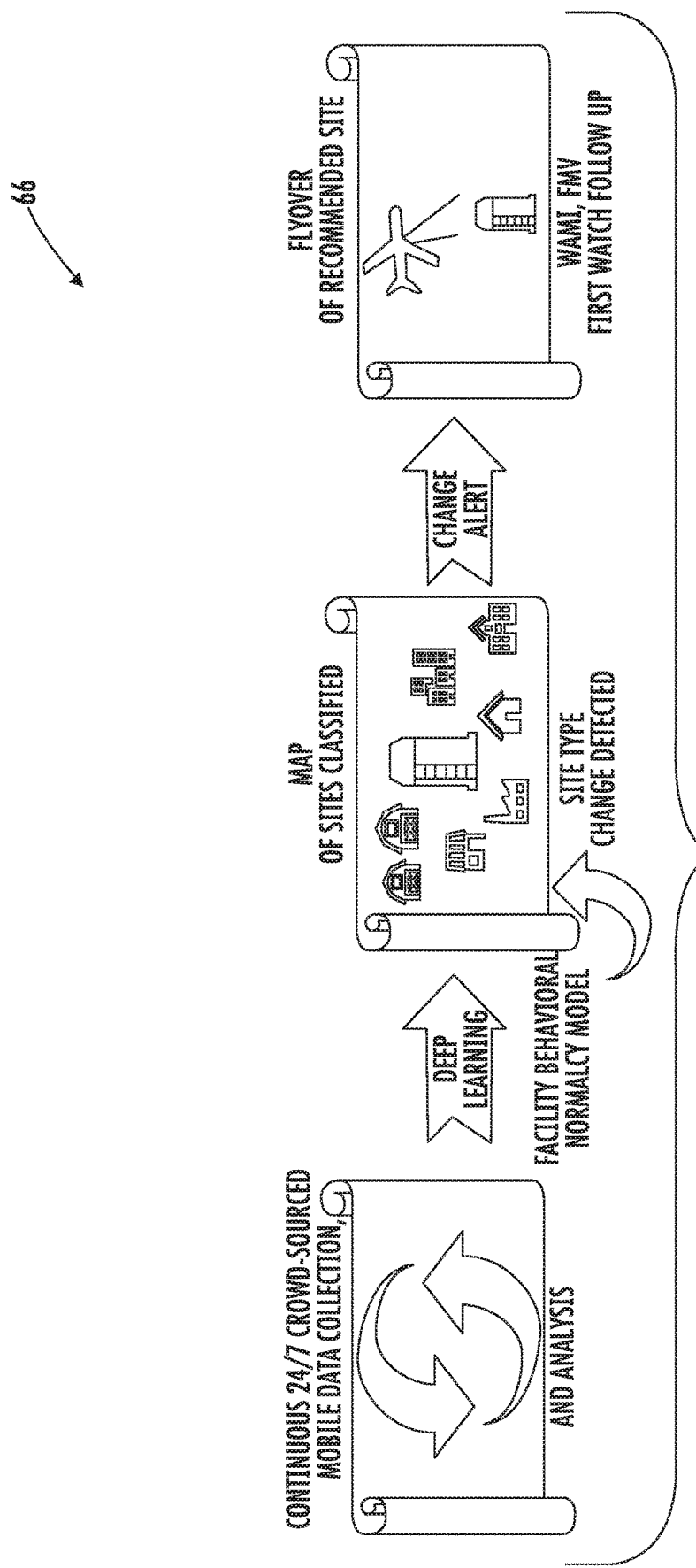
Figure 5:
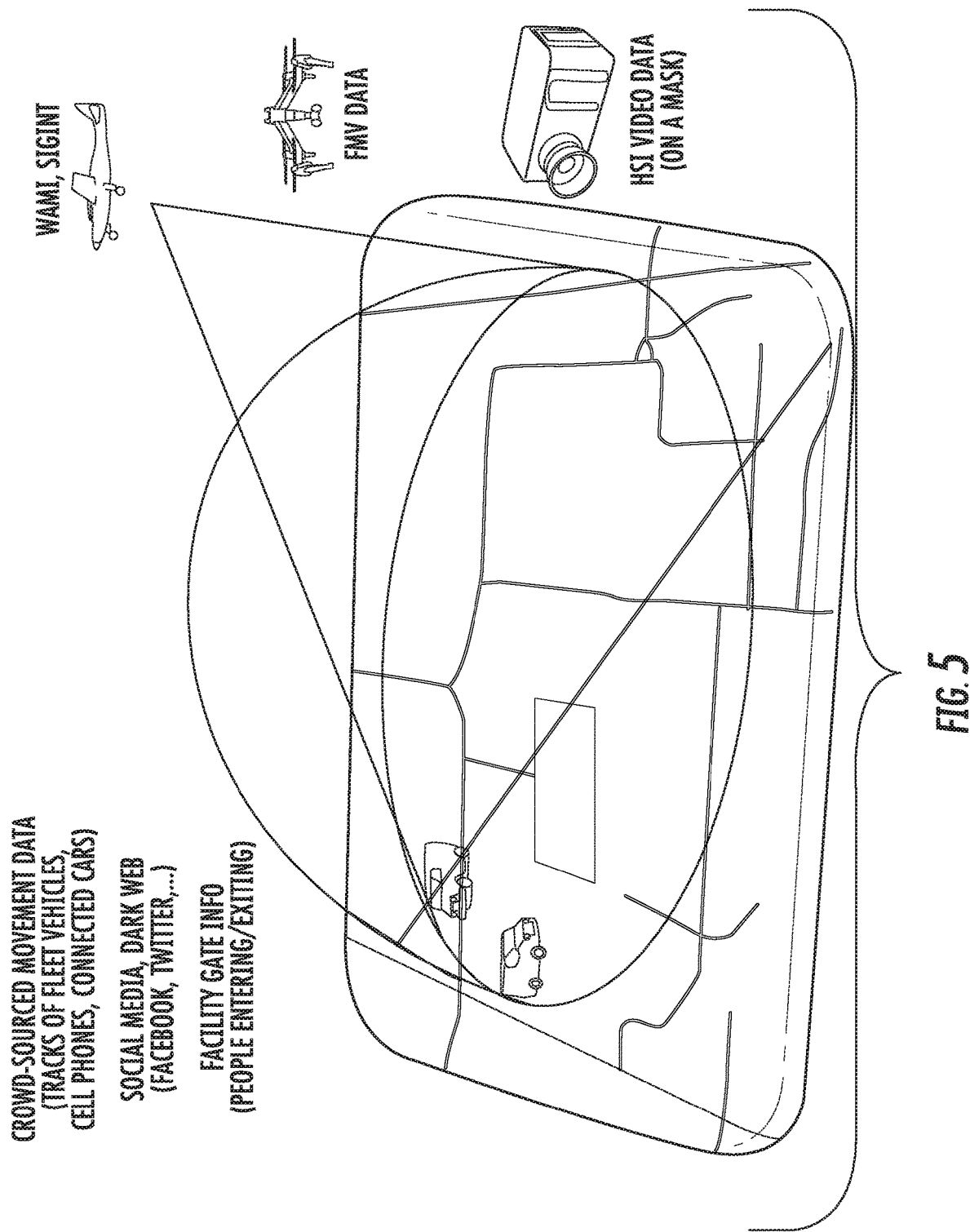
FIG. 5 is a schematic diagram illustrating aerial follow up operations performed responsive to anomaly detection by the system of FIG. 1 in accordance with an example implementation.

Referring additionally FIGS. 2A-5, an example modeling process which may be implemented by the system 30 combines data wrangling (at Blocks 41-44), geospatial processing (at Blocks 45-47), and machine learning (at Blocks 48-54) with associated notational techniques (Block 55-59) to provide target recommendations for additional monitoring accordingly (Block 61). These steps are summarized in the inset 62, as well as in the flow diagrams 65, 66 of FIGS. 3 and 4. As noted above, the CSMD data may come from a variety of different input sources 63 such as WAMI/SIGINT aerial platforms, mobile devices, connected vehicles, fleet vehicles, etc., as shown in FIG. 5.

The illustrated machine learning pipeline develops a site normalcy model based on automated unsupervised learning. The fourth step (Block 51), automated supervised site classification signature mixture model, automatically receives its labels from the third step (Block 49), unsupervised site classification coarse-grained. Although no manual effort is required in this process, human intervention may optionally be used in some applications to enrich the knowledge base and/or to provide ground truth labels (e.g., restaurant) for machine generated labels (e.g., site type 17) in the infancy learning phase, if desired. The deployed operations and maintenance (O&M) phase of the system development life cycle may advantageously be fully automated.

Figure 6:
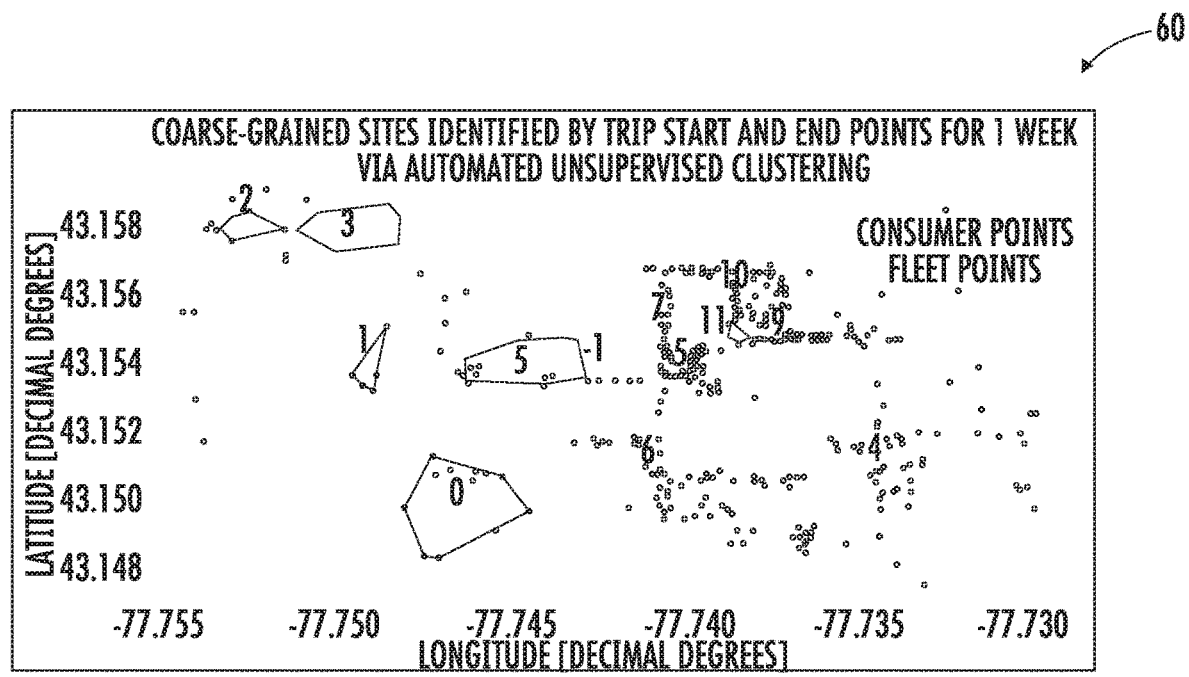
FIG. 6 is a plot of latitude vs. longitude for trip start and end points identified by the system of FIG. 1 along with calculated site boundaries in accordance with an example implementation.
Figure 7:
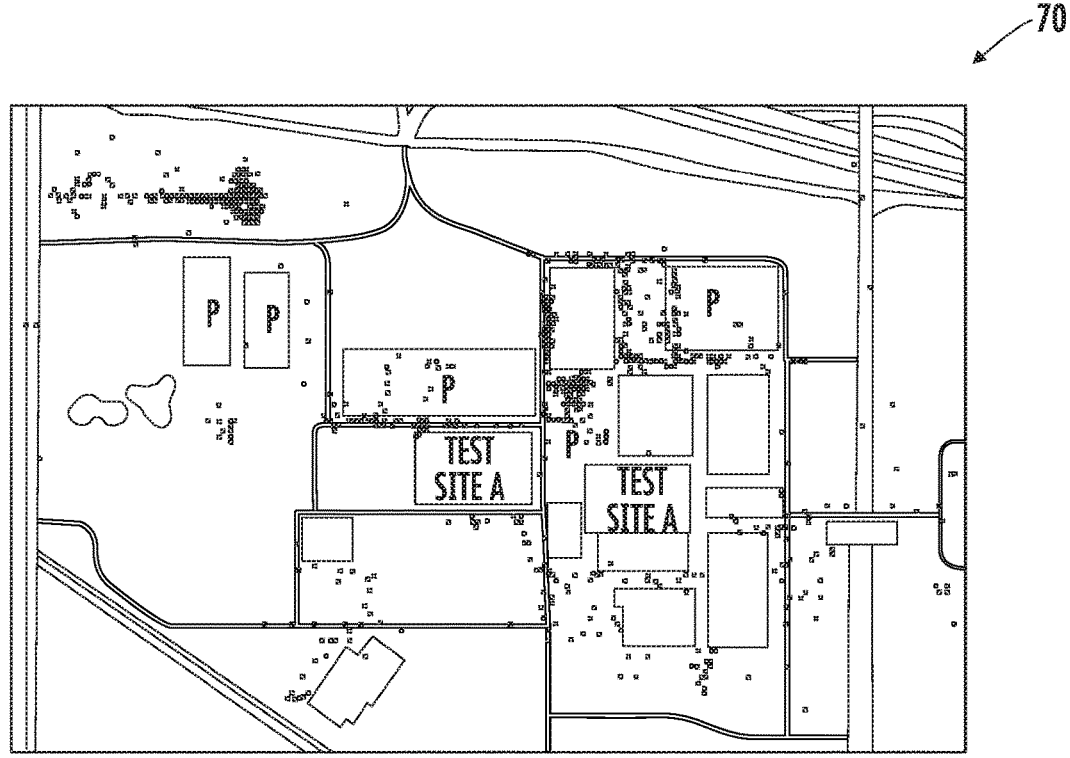
FIG. 7 is an aerial map with the identified points from FIG. 6 overlayed on respective geographical positions illustrating how the processor determines sites of interest correspond to respective structures.

The monitoring process will be further understood with reference to a test case in which a normalcy model was validated based upon data collection in Rochester, N.Y. While the CSMD collection was real-time, the acquisition, and subsequent processing, of that data, was one week later in the form of static files. Referring additionally to FIGS. 6 and 7, the latitude/longitude graph 60 of FIG. 6 shows dynamic CSMD data points collected from embedded GPS and mobile devices corresponding to Test Site A in Rochester, N.Y. In this test case, MyGeodata Converter was used to transform the CSMD CSV file to a KML file, and then to plot the trip start and end points shown in FIGS. 6 and 7 for the data collection period. As will be seen from the map 70, the trip start and end points align with parking areas for specific businesses in the Site A.

Zooming into the extremely densely populated area in the northwest corner of the trip CSMD start and end point plot 60 and map 70 it can be seen that these points are clustered about the isolated Road 1, and in particular at the road's dead-end. Initially, one might hypothesize that these vehicles were trucks in the Commercial Shipping distribution center parking lot; however, plotting these coordinates on Google Maps revealed that most vehicles were parked at the Wholesale Food Products Distribution Center. The manual observation of Commercial Shipping and Wholesale Food Wholesale Food Distribution as unique sites was used as a baseline to compare with the automated and unsupervised delineation and identification of sites performed by the system 30.

Patterns of life assisted facility monitoring is not a time series analysis problem, as we are not attempting to predict future behavior, but rather to monitor current behavior for characterization of those facilities. Time of day and day of week patterns may be important to characterizing the type of site represented by each cluster. Clusters with weekday commonality suggest a similar category of facility. In the present example, comparing the combined cluster start and end days of the week, trip start and end days greatly differed on Mondays and Thursdays.

During exploratory data analysis, initial clustering was employed to segregate sites, where '113' represented outliers not assigned to a site cluster. Trip distance travelled and trip mean speed proved to be influential factors in site identification membership.

In the test configuration of the system 30, the following hardware and software components were used to run simulations on the CSMD data. The framework was developed in Python (version 3.5.2) with the Enthought Canopy (version 2.1.6.3665) integrated development environment (IDE). CSV files were read in with Pandas version 0.20.3. MySQL Server version 5.6.31 was installed and representative WAMI SQL files were read in with SQLAlchemy version 1.2. The geospatial processing was performed with the GeoPandas package (version 0.3.0) in concert with HDB-SCAN (version 0.8.1). The training, testing, and evaluation of Step 4, supervised site classification, of the modeling process was prototyped with Keras (version 2.1.3) running on top of TensorFlow (version 1.5.0); however, the transposition and embedding of feature columns were not. The host laptop specifications included: 16 GB RAM; Intel quad-core i7@2.6 GHz processors; 1 TB SDD; NVIDIA GeForce GTX 960M GPU; and Windows 10. Representative WAMI data was imported into an instance of MySQL Server (version 5.6.31). However, it will be appreciated that other hardware and software components may be used to implement the system 30 in different embodiments.

CSMD timestamps (StartDate, EndDate, CaptureDate) were provided in UTC ISO 8601 Zulu time, which is 5 hours ahead of the ROI winter season data collection sites' Eastern Standard Time (EST). CSMD timestamps were converted with Pandas to datetime values. Features designated in meters (TripDistanceMeters, TripMaxSpeedKph, TripMeanSpeedKph) were converted to miles and values binned into 4 buckets determined by their percentiles. This was done as a form of normalization as distance and speed ranges were spread from 0 to 423 and 124 respectively, vastly different in range from the other feature values. Null value variables (FirstZoneName, LastZoneName, MultipleZones, MultipleCorridors), as well as those deemed non-applicable (e.g., singular value) during EDA (Mode, EndpointType, MovementType), were dropped from the dataframe.

In some embodiments, it may be desireable to use a rolling window equivalent in location and size to the WAMI data collection area (for this WAMI system approximately 2 km in diameter) to progress through, and process, the CSMD. The reasoning is twofold, namely that it would: 1) support WAMI and CSMD fusion synchronization; and 2) provide finer grained analysis of clusters. This example test case focused on the SITE-A Sub Region of the Rochester collections. Of the 9023 rows in the CSMD Trips DataFrame (representing the aggregated 393613 rows of waypoints), 1192 were identified by longitude and latitude as being within the Rochester sub-Region Test Site A(SITE-A). A polygon geometry was created to bound the points within the SITE-A Sub Region (see FIG. 6).

To identify the site clusters in the SITE-A Sub Region, a new DataFrame geospatial coordinate variable was fashioned with the GeoPandas Shapely Geometry Point function, using the existing latitude and longitude trip features as parameters. Polygon (initialized to '0') and point geometry feature columns were additionally added to the Pandas DataFrame. A cluster column was also added and initialized to '−1'.

To support the mission of facility monitoring without the luxury of training data or imagery, as is the case in most real-life scenarios, unsupervised machine learning is an alternative method for identifying and classifying sites, sans labels and truth data. Clustering is a non-parametric model, whereas for deep learning, Restricted Boltzmann Machines (RBMs) exploit feature abstraction for classification. The 4-step process shown in FIGS. 2A-2B begins with unsupervised coarse-grained learning in the form of clustering and ends with automated supervised fine-grained learning via a dense deep neural network (DNN).

Three spatial clustering algorithms were compared during site identification: Kmeans2, DDBSCAN, and HDBSCAN. HDBSCAN was chosen as the geospatial clustering algorithm of choice. Although Kmeans2 utilizes less compute time on larger data sets, HDBSCAN operates on rolling windows of modest size to mitigate to yield a more accurate result. From the test results it was determined that Kmeans2 and HDBSCAN were superior to DDBSCAN for identifying finer grained details. Moreover, HDBSCAN also exhibited certain advantages over Kmeans2, including: 1) no hyperparameter k to be manually pre-set for the estimated number of clusters to be created; 2) no hyperparameter I to be manually pre-set for the number of Kmeans iterations to be performed; and 3) less outlying points attached to fabricated clusters.

In terms of providing an infrastructure that supports automation (with minimal human configuration or intervention) of machine learning in a dynamic setting with real-time updates, HDBSCAN is attractive in that it only requires the minimum membership count for a grouping of points to be considered as a candidate for a cluster. DDBSCAN is like HDBSCAN in that it also requires the minimum required members count to create a cluster; but, DDBSCAN also requires the radius that will determine if points are within reach to be considered cluster members. Further, DDBSCAN core point radius strategy tends to yield a more coarse-grained result as core points "reach" extends the area of the newly formed cluster. However, it will be appreciated that all of the above-described algorithms (or other suitable approaches) may be used in different implementations.

The HDBSCAN algorithm was chosen for this the test implementation. The process employed the GeoPandas package imports GeoSeries and GeoDataFrame to create the SITE-A trips smallest convex polygon boundaries for each cluster identified by HDBSCAN. A polygon holds at least 3 points, whereas a LineString contains 2 points and a Point contains 1 point. A minimum number of points to constitute a site, aka minimum cluster membership, may be defined for the mission concept of operations (CONOPS) rather than just a clustering function parameter. What is a site in terms of patterns of life? How many entities or objects constitute a site (e.g., cluster)? The minimum number of points required to form a cluster for this example was set at 20 (although other values may be used in different implementations), whereas the HDBSCAN algorithm decided on the actual number of clusters, 12, to be fashioned (see FIG. 6). The algorithm deduced that there were less site clusters identified than were requested. This behavior prevents splitting sites as well as preventing forced outlier membership.

In the plot 60 of FIG. 6, 113 represents the outlier "cluster" with 252 members which represents vehicle trips not assigned to a site cluster. These outlier trips are not likely attributable to a site, but transient or at least attributable to a closed or abandoned site, a disabled vehicle, or a car pulled off the road. Site cluster 103 has the densest point membership at 339 members, followed by cluster 108 at 138 members. For site cluster 103, FIG. 26, there are ~114 points plotted out of 339 total member points with only 10 unique points. This suggests regularly assigned parking lot spaces with a trip time trend behavior.

Referring again to FIG. 7, the densely clustered points on Road 1 represent two separate distribution centers, the Commercial Shipping and Wholesale Food distribution centers. The Wholesale Food distribution center, located at the East end of Road 1, has the bulk of points (vehicles parked). DDBSCAN did not pick this up, but Kmeans and HDBSCAN did. HDBSCAN provided an even finer granularity to Kmeans by separating nearby outliers from the clusters that can be seen to represent smaller facilities. The Start and End Points from the Trips data source for the Wholesale Food Distribution Center span a 1-week time interval with the 339 geometries recorded. The figures show far less data points than that, which are in a geometric pattern, suggesting a parking lot with assigned slots.

Twelve clusters (100 through 111) were identified and labeled by HDBSCAN. Outliers not fit to a cluster are represented by placeholder cluster 113. HDBSCAN automatically discovered site clusters (e.g., potential facilities, parking lots, meetups) without training data, labels, human intervention or hyperparameters requiring configuration adjustment. HDBSCAN provided for enhanced accuracy by allowing site clusters to have varying density, while not requiring sparse data (noise) to have cluster membership. HDBSCAN site cluster results track closely to actual sites in the SITE-A Sub Region. Site cluster 100 contains two facilities however. Further analysis showed that the vehicles in Cluster 100 are divided into 2 sub areas by consumer vehicles and fleet vehicles. HDBSCAN provides the initial unsupervised learning of candidate sites as coarse-grained clusters to be further refined by vehicle behavior and characterization in subsequent processing.

The next step classifies the site clusters by trip type via unsupervised partitioning. This methodology is similar to market segmentation of consumer purchasing behavior. The Kmeans algorithm was utilized. The outliers (marked '113') were dropped from the DataFrame. Recall that maximum and minimum speed were binned into 4 buckets as a form of normalization. The GeospatialType was converted from string to integer. IsStartHome and IsEndHome Booleans were converted to binary. The ProviderType, ProviderDrivingProfile, and VehicleWeightClass were highly correlated, and left untouched—an opposite strategy to linear regression dimensionality reduction.

The time of day was split out from the day of the month. Time windows (bins) were created for the StartDate and EndDate variables (LeaveTime_Window, ArriveTime_Window) after extracting the datetime hour. The four bins divided a 24-hour day into 4 bins representing patterns of life phases of a 24-hour day: midnight, sunrises, midday, and sunset. Additionally, a trip duration (TripDuration) feature was added, the difference of EndDate and StartDate, whose value in hours was converted from time delta to an integer.

Kmeans was run on the trips data with the number of site types k equal to half the number of identified site clusters. Two new variables were added, SiteType_pred and SiteType_asgn. The site type predicted values were the Kmeans labels returned from fitting the model for each trip row. The site type assigned values were the site type predicted value with the maximum trip row count for rows allocated to each cluster.

The SITE-A sub region data collection set of 940 entries was split 70/30 for training and test sets. As a minimum set containing 2000 observations would have been preferable, a wide model and a long model were both run for comparison due to the concern of overfitting due to the relatively small number of observations. A pseudorandom seed was set to keep results consistent. The transposed wide model had 46 independent variables and 1 dependent variable (classification label) with 629 training rows and 311 test rows. The long model had 15 independent variables (features) and 1 dependent variable (classification label) with 629 training rows and 311 test rows (observations).

Step 4 (Block 51) refines Step 3 (Block 50) site type classification by using Step 3's auto-generated site type assignments (SiteType_asgn) as supervised learning labels inputted to a dense deep neural network. Selective feature transposition increased the number of independent variables from 15 in Step 3 (Block 50) to 46 in Step 4 (Block 51) plus the auto-generated dependent variable, SiteType_asgn from Step 3. The cluster column transposed from long to wide creating 12 binary-valued (0,1) columns (c0 thru c11). StartWDay and EndWDay were also transposed, creating 7 binary-valued columns (swd1 thru swd7, and ewd1 thru ewd7 respectively). LeaveTime_Window and ArriveTime_Window were transposed, creating 4 binary-valued columns (ltw1 thru ltw4), and atw1 thru atw4 respectively). Wide transposed DataFrame feature columns as follows:

---

'SiteType_asgn',
'TripDuration', 'TripDistanceMiles', 'TripMeanSpeedMph',
'TripMaxSpeedMph',
'IsStartHome', 'IsEndHome',
'GeospatialType',
'ProviderType', 'ProviderDrivingProfile', 'VehicleWeightClass',
'c0', 'c1', 'c2', 'c3', 'c4', 'c5', 'c6', 'c7', 'c8', 'c9',
'c10', 'c11'
'swd0', 'swd1', 'swd2', 'swd3', 'swd4', 'swd5', 'swd6', 'swd7',
'ewd0', 'ewd1', 'ewd2', 'ewd3', 'ewd4', 'ewd5', 'ewd6', 'ewd7',
'ltw1', 'ltw2', 'ltw3', 'ltw4',
'atw1', 'atw2', 'atw3', 'atw4'

---

A Sequential 4-layer (3 hidden layers, 1 output layer) fully connected (dense) deep neural network (DNN) model was constructed for Step 4 (Block 51), with hyperparameter values: classes=6; input size=46; batch size=20; hidden neurons=8; and epochs=55. Step 3 (Block 50) automatically generated the number of classes for the DNN in Step 4 (Block 51), and site type labels, SiteType_asgn. The more epochs ran, the more accurate the model; but, the cost of more CPU cycles spent on the additional back-propagation to adjust the weights has a point of diminishing returns. The model was fitted and evaluated on a 70/30 data set split. The training set contained 629 observations and 46 features. The test set contained 311 observations and 46 features.

Figure 8:
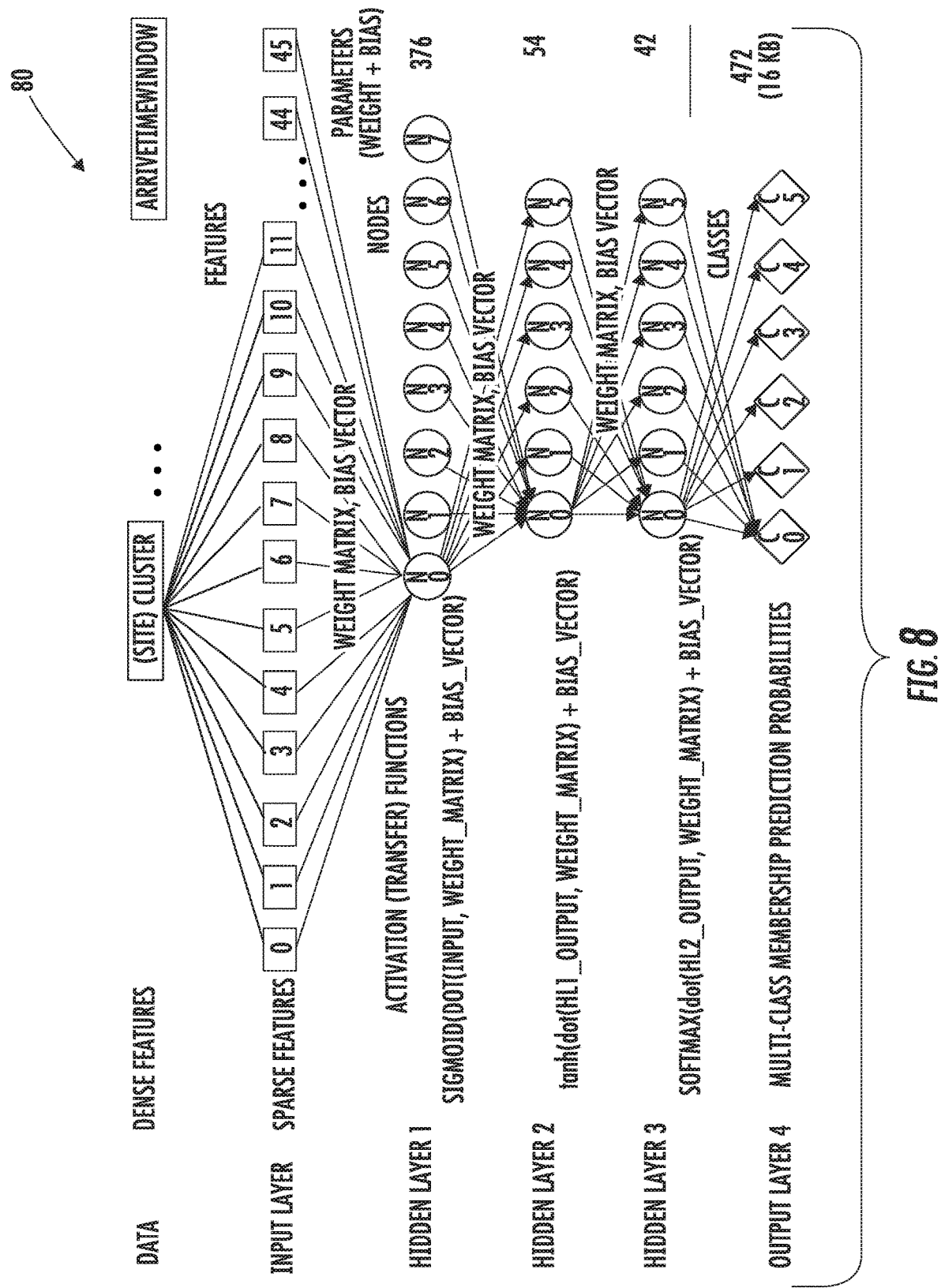
FIG. 8 is a diagram of probabilistic partitioning and deep learning operations which may be implemented by the system of FIG. 1 in accordance with an example implementation.

The DNN contained 3 hidden dense layers, with a total parameter count (weights+bias) of 472. The diagram 80 in FIG. 8 provides the dense DNN architecture used in this example. The first hidden layer utilized the sigmoid non-linear activation function as the transposed sparse columns were binary valued. The second hidden layer applied the hyperbolic tangent (tan h) activation function for computation optimization in case of gradient descent, since data will be centered around 0 [range (−1, 1)], the derivatives will be higher [as well as] reducing bias in the gradients." The third hidden layer employed the softmax activation function, a sigmoid generalization, to output classification probabilities to the fourth output layer. Regularization may be considered, for example, if the Rectified Linear Unit (ReLU) activation function had been used, as its tendency to overfit would have been compensated for by Dropouts. The fitted model evaluated to 99% accuracy and ran within 201 μs/step on 311 test observations.

As a double check, the original long model was fitted with the same 70/30 data split, except for 15 features rather than the transposed 46. The lesser the number of input independent variables, the smaller the count of deep neural network parameters (weights, bias); however, the penalty is a decrease in accuracy. To reduce the size of the weight matrix, an alternative solution to transposing to a wide network would be to increase the number of layers. Running the same DNN model on the long data frame produced a total parameter count of 224, approximately half the parameters of the wide model. The fitted long DNN model evaluated to a degraded 79% accuracy but ran faster with 167 μs/step on 311 test observations. When deploying the DNN into a production environment, code from TensorFlow or Keras is not necessary, just the mathematical activation (aka non-linear transfer) function code with exported parameters (weights and bias) to run on the new input.

The system 30 accordingly provides not only an unsupervised automated site identification process, but also an unsupervised automated site type classification process. In the example implementation, site identification was a two-step process where groupings of individual vehicle trips' start and end points were analyzed, via density-based HDBSCAN clustering, that identified specific, but untyped, sites; and then, the sites would be decomposed, if necessary, by vehicle type (e.g., consumer versus business). Moreover, site classification was implemented as a two-step procedure where Kmeans partitioning first performed coarse-grained unsupervised classification; and secondly, a dense DNN reused the Kmeans auto-generated site class labels for fine-grained training.

In accordance with another embodiment for site classification, all vehicle trip line items (rows) allocated to a specific cluster may be collapsed with feature columns summed up into a single cluster line item. This would be like a recommendation engine for market segmentation, where the multiple variable sums would become a labeled vector for input into a deep neural network, which would compare the clusters' vectors against each other. However, the approach taken in the example implementation was to use the trip observations assigned to each cluster as variants of that cluster's behavior. This tactic would be similar to image classification, where variants of an image are used for training. Type was assigned to each of these clusters by characterizing the behavior of individual vehicles starting or ending their trip within each respective site cluster by trend (e.g., days, times, distance, speed) and by provider (e.g., consumer, fleet, taxi).

The fourth step of the modeling process (Block 51 of FIG. 2B) for the construction of the patterns of life normalcy model refined Step 3 (Block 50) site type classification by using Step 3's auto-generated number of site type classes and site type classification assignments (SiteType_asgn label) as supervised learning labels to be automatically input into a sequential 4-layer (3 hidden layers, 1 output layer) fully connected (dense) wide deep neural network. The wide DNN had a total parameter count (weights+bias) of 472, based on a 46-feature set, some of which were transposed sparse binary columns. The fitted wide DNN model evaluated to 99% accuracy and ran within 201 μs/step on 311 test observations.

As the SITE-A sub region data set (940 observations) was split 70/30 for training (629 rows) and test (311 rows) sets, the original long model (15 features) was fitted as well for comparison due to the concern of overfitting due to the relatively small number of observations. The original long DNN model evaluated to a degraded 79% accuracy but ran faster with 167 µs/step, with only 224 parameters. The lesser the number of input features, the smaller the count of DNN parameters (weights, bias); however, the tradeoff is a decrease in accuracy.

An alternate approach is to reduce the size of the weight matrix would be to increase the layer count. The epoch (single iteration of forward and back propagation over a training data set) count could also be increased; but, the cost of more CPU cycles spent on the additional back-propagation to adjust the weights has a point of diminishing returns. In the test configuration, the raw output results of the DNN yielded primary and secondary site type classifications, and site types (0-5) by count were assigned to each cluster (0-11) identified as its primary and secondary site type. However, in different implementations, different numbers/types of sites/categories may be provided.

Figure 2B:
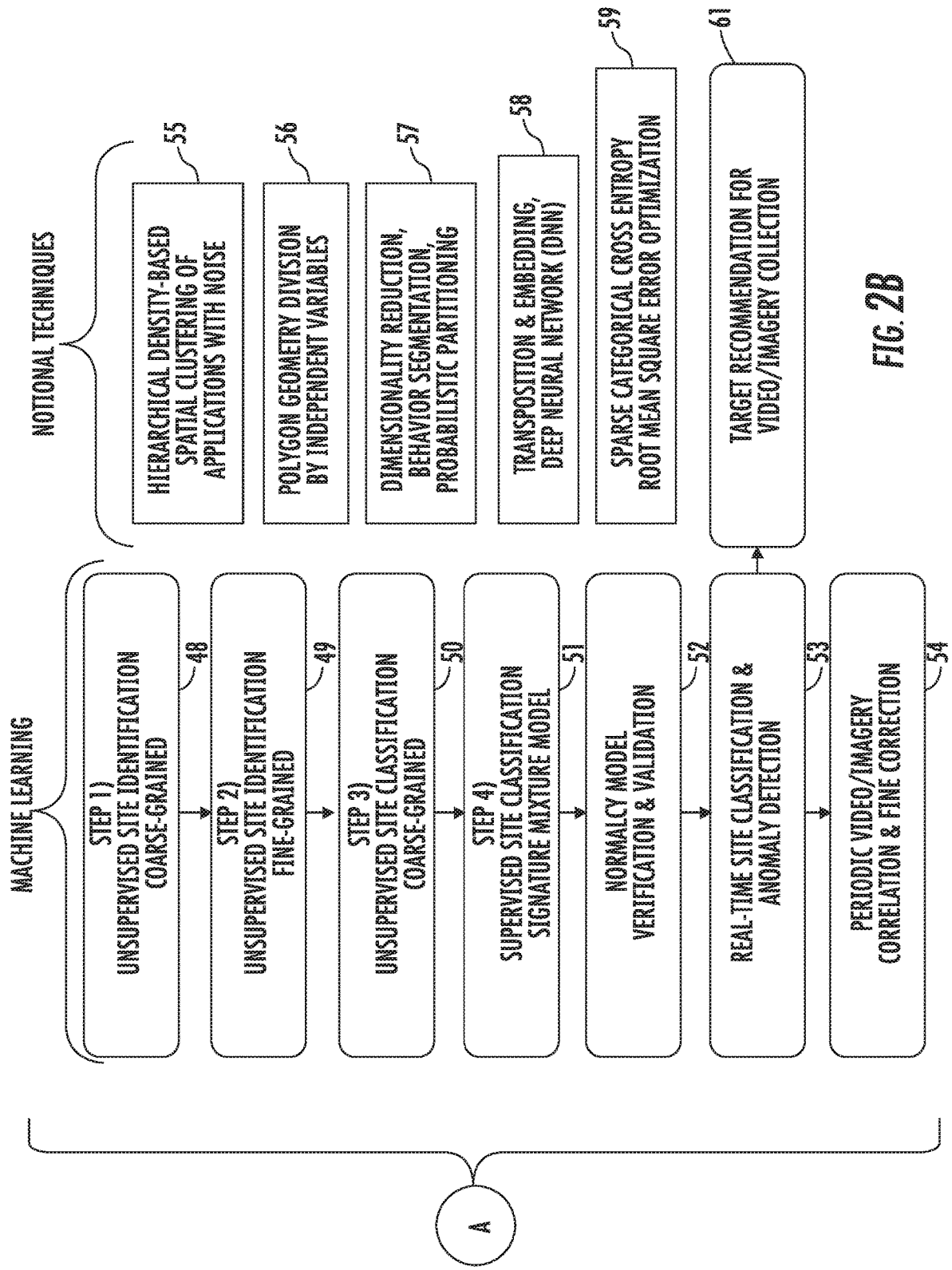

Recall that each trip observation was input to the DNN as a variant of the auto-generated site type assigned in Step 3 (Block 50 of FIG. 2B). The site type predicted values were the Kmeans labels returned from fitting the model for each trip row, and the site type assigned values were the site type predicted value with the maximum trip row count for rows allocated to each site cluster, where the site cluster feature was treated as just another feature in the mix.

Figure 9:
FIG. 9 is a table illustrating trip observations extracted from crowd-sourced mobile data (CSMD) which may be used by the system of FIG. 1 for site classification in accordance with an example implementation.

To define the patterns of life in Step 4 (Block 51 of FIG. 2B) for each site type classification in a behavior normalcy model, the wide model was reverted to the long model. The highest probability for each of the 14 features associated (excluding site cluster identification) with an identified specific site type (primary and secondary) was reverted to its data dictionary definition, and recorded in a Site Classification Behavior Normalcy Model based upon the trip data, which is shown in the table 90 of FIG. 9. Time of day, and the day of the week, were significant features influencing site classification. Trip maximum speed and trip total distance were also significant features.

For example, a site type '0' has a prominent days-of-the-week trend of heavy trip starts and ends Monday through Friday, with slow weekend movement. Site type '0' experiences sunrise and midday as the heaviest trip start and end times and midnight as regular activity; however, sunset is slow for trip starts but regular for trip ends. For site type '0', trips are usually under 1 hour in duration, less than 12 miles in distance, with a mean speed of greater than 54 mph and maximum speed under 68 mph suggesting highway driving. These trips either originate or end in the SITE-A sub-region. The provider is a fleet local delivery or field service with medium sized trucks or vans. Wholesale Food Products Distributors, site cluster 103 and primary site type '0', was the densest data collection area in the test case.

Comparing the automated results with information from the Wholesale Food Products website, most deliveries are less than one hour in duration to other cities in New York, but are approximately equal to less than 60 miles in distance. The Wholesale Food also can provide service to other states: Connecticut, Maryland, Massachusetts, New Jersey, Pennsylvania, and Virginia. However, secondary site types for primary site type '0' are '4' and '5', where site type '5' has a heavy-duty truck fleet with trip distances exceeding 64 miles with a maximum speed of 80 mph. The site classification normalcy model recognizes sites with mixed behaviors, and advantageously types them as primary and secondary behaviors. In the absence of the Wholesale Food trucking schedule for the week of the SITE-A sub region data collection, the normalcy model reported that more in-state deliveries were made than out-of-state, and that none of the deliveries were made within the SITE-A sub region area. However, the test case suggests that the days-of-the-week and times-of-day trends have a greater impact on the classification of sites than the provider, vehicle, or trip features. This may be due to CSMD bias toward businesses that have procured 3rd party service vehicle tracking services versus individual entities that have anonymously signed up to crowd-source their data for free while travelling, for example.

As another example, site type '2' has a prominent days-of-the-week trend of regular trip starts and ends Monday through Friday, with no weekend movement. Site type '2' experiences sunrise and midnight as the regular trip start and end with no activity at sunset; however, midday is slow for trip starts but regular for trip ends. For site type '2', trips are usually under 2 hours in duration, less than 64 miles in distance, with a mean speed of less than 19 mph and maximum speed under 68 mph suggesting a mix of congested city traffic and highway driving. These trips either originate or end in the SITE-A sub-region. The provider is a fleet local delivery or field service with heavy trucks. Commercial Shipping, site cluster 2 and primary site type 2, was adjacent to Wholesale Food on Road 1. The site identification process of this test implementation successfully divided the dense area into two site clusters. Site type '2' secondary behavior types were '3' and '4' (Block 49, FIG. 2B), suggesting that Commercial Shipping has medium trucks and vans doing local delivery as well. For the Commercial Shipping and for the Wholesale Food, consumer and employee vehicles may also have accounted for a minority of the data points.

Site clusters identified may either be referred to by ID number, or may be assigned names (e.g., Commercial Shipping, Wholesale Food). Site types classified may also either be referred to by type number, or may be assigned names (e.g., restaurant, distribution center). This would depend on the degree of automation and the objective of the behavioral normalcy model. For instance, a user may not care what the name or type of the site is, but rather if the behavior of the site changes.

The concern of overfitting due to the relatively small number of observations (albeit unsupervised), which is also a concern in typical real-life supervised scenarios, prompted fitting a transposed sparse wide (see FIG. 8) as well as a long model. The wide model produced a 99% accuracy, whereas the long model returned 79% accuracy for site classification. The normalcy model accurately portrayed the SITE-A sites and their primary and secondary behaviors, as can be seen through the optional mapping of site clusters to the extant facilities which can be confirmed manually or automatically (e.g., site '0' is Wholesale Food, site type '0' is a distribution center) following the automated modeling process.

Significant features influencing the classification of sites were the day(s) of the week and the time phase of day for trips starting and ending at each site. Distinct day(s) (e.g., no trip starts, but trip ends, on weekends) and time patterns (e.g., midnight, sunrise, midday, sunset) for each site type became clearly visible and delineated. Although the provider and vehicle types were highly correlated and factored into the classification, there was implicit bias as the data collected was primarily from distribution fleet businesses employing the "connected vehicle movement service" vendor that supplied the crowd-sourced mobile data. However, as the SITE-A was predominantly populated by distribution type businesses, the bias impact was tempered. As connected devices increase in usage by incentive and technology (e.g., consumer free services, standard installation by automaker and mobile device manufacturer, smart homes, etc.), the inherent bias will decrease, and the behavioral detail will increase.

Typically, unsupervised deep learning, where the feature set lacked classification labels, would turn to autoencoders or Restricted Boltzmann Machines (RBMs) for a solution. For this example implementation, the construction of a multi-technique machine learning modeling process that culminated in a deep neural network compensated for the lack of supervised training data. The clustering and partitioning steps auto-generated the site identification and classification labels necessary for the deep neural network. The trip observations were viewed as site type variants for each site cluster identified, similar in nature to image variants for training a convolutional neural network for image classification.

Various benefits may accordingly be achieved from the continuous crowd-sourced mobile data analysis, including, for example: 1) automated identification of sites without training data; 2) automated classification of sites without training data; 3) automated normalcy model for site types' primary and secondary behaviors; 4) automated detection and characterization of changes in Patterns of Life; and 5) recommendations for detailed evaluation of changes with flyover or other monitoring techniques. The identification and classification of a stationary object that is inaccessible for classic data collection methods may benefit from being characterized by activity-based intelligence, the patterns-of-life of the non-stationary entities that interact with that site over a variable but continuous time interval, by dynamically evaluating the patterns-of-life trends of those objects, as seen in FIG. 3.

In the test implementation, the Test Site A sub region of interest scenario mimicked a real-life situation where aerial data was unavailable to construct a behavioral normalcy model. In such real-life situations, flyovers (or other monitoring) may be cancelled because of expense, availability, weather, lack of daylight, no-fly zones, etc. The value of patterns of life information mined from MULTI-INT data sources becomes apparent in these instances, particularly for focusing expensive follow-up resources where most appropriate. The CSMD may be processed to provide a stand-alone automated unsupervised coarse-grained quick-react spin up of a behavioral normalcy model, based on patterns of life, to identify sites of potential interest. The CSMD behavioral normalcy model does not require training data and is able to identify and classify sites without a human-in-the-loop, as noted above.

The quick-react CSMD normalcy model may then be utilized as an automated first watch to recommend specific sites for aerial inspection follow up (or other monitoring), as shown in FIG. 4, conserving limited WAMI and FMV resources for these CSMD pre-selected sites. This technique will result in the rapid construction of Normalcy Models, built to accurately describe the typical behavior of specific facilities over time, paving the way for feature and anomaly detection, empowering pro-active decision-making versus reactive forensic analysis.

Accordingly, building a behavioral normalcy model from crowd-sourced mobile data may be comparatively fast, inexpensive, and accurate, as well as providing a continuous collection. The above-described normalcy model process may accommodate various applications for recognizing and categorizing day/time patterns of entity movement and facility activity density. For example, if the parking lot density exceeds allotted parking spaces, expansion may be needed for a growing business or perhaps a tow service to preserve spaces for customers. In another example, if a distribution center that is closed on the weekends experiences Saturday midnight activity, a security service may be in order. Moreover, if behavior completely changes, a facility may have been sold, repurposed, or purposely misrepresented.

The system 30 may accordingly be used to augment and improve activity-based intelligence, and commercial competitive analysis, as well as rapid response to growth within "Connected Cities," and may also have the potential to replace WAMI and FMV reconnaissance for initial identification, classification, and change detection of unknown facilities as more personal, vehicular, and facility devices are deployed and become "connected", reducing bias while increasing accuracy.

Various other applications in which the system 30 may be utilized are now described. By way of background, mobile phones are either equipped with, or have the capability to have installed, sensors (e.g. proximity sensor, accelerometer, gyroscope, compass, barometer, magnetometer, thermometer, biometrics) that may provide additional environmental crowd-sourced data beyond GPS location. Vehicles also may have built-in probes to report crowd-source data (e.g. speed, distance, time, latitude, longitude, elevation, temperature, weather, road conditions). In the near future every electronic device will have an IP address and communicate health and status via wireless. Commercial wireless information collection agencies will anonymize (non-attributable names) the data from the individual devices while re-selling the data tagged with additional information. For instance, a CSMD data provider sells their small vehicle sensor devices to shipping companies like UPS and FedEx (and also to private vehicle owners) to track their drivers and trucks. The CSMD data provider also sells this data to MapQuest to display traffic delays. Private citizens are also signing up to have their data uploaded from their mobile phones and vehicle sensors to get free services or rewards. Such crowd-sourced data may advantageously be used by the system 30 with respect to the example applications described herein (and others). However, it should be noted that crowd-sourcing data collection is not limited to mobile phones or vehicle sensors; land, water, and air sensors as well as 'smart-home' sensors and social-media may be additional sources of intelligence.

A first example implementation related to weather services. The National Weather Service, NOAA, has multiple types of weather sensors that are primarily air and sea based. Land sensors are relative sparse. Some private citizens have amateur weather stations. In an example implementation, broad area predictions provided by NOAA (or other entities) may be optimized by integrating crowd-sourced mobile data from any type of IP wireless device that is in the area when smoke or clouds are blocking overhead sensors. Another source is crowd-sourcing social media reports (e.g., Twitter, Facebook, Instagram, texts, etc.) Still another application source is crowd-sourcing home digital assistants, such as: Google Home; Amazon Echo; Apple Home pod; Alexa; Google Assistant; Siri, etc. Example crowd-sourcing sensor types may include: electroscope (electric charge presence—like lightening); ambient temperature; barometric pressure; wind speed; wind direction; relative and absolute humidity; dew point; wind chill; heat stress index; ambient light; UV index; PAR; irradiance; latitude, longitude, elevation, altitude; wind speed; and magnetic and true direction Another application relates to insurance. In the near future, all vehicles will have a factory-installed GPS sensor that reports back sensor data (e.g. speed, location, temperature, oil level, tire pressure, etc.). Metadata (e.g., make and type of vehicle, color, age, Carfax) can be tagged onto this vehicle sensor data for analysis, predicting the driver's ability and their car's maintenance upkeep—both of which predict the possibility of being in an accident either by their own fault or by mechanical failure. This is important for insurance companies when setting car insurance premiums.

However, the above-described approach may advantageously provide a further extension by looking at patterns of activity of cars in a specific area (e.g., rush hour, specific city street, specific city) to see if not only living in that area, but that particular route to work, is of higher or lower probability of an accident. In some implementations, this may also include dash cam video and audio analysis that may be wirelessly relayed. This would be significant for settling car insurance claims by having footage as evidence. An insurance premium discount could be given for having the dash cam and sending the data.

Still another application is with respect to health. Not only may smart wrist bands report health status for a health insurance discount, but cell phones may also report environmental variables (e.g., smoke via cell phone chemical sensor, outside temperature, pressure, and humidity) and location (e.g., bar, gym, park, driving, sitting, standing) to health providers. Similar to the auto insurance case described above, POL modeling as described above may be used to determine locations or behaviors that correlate with different health trends, for example.

Another application is planning for retail sales scenarios. In one example, this may be used for competitive analysis, e.g., where are customers going when they are not at your store. Another use case may be planning and scouting for new franchise locations (e.g., what is the next best location?). Still another use case is setting store and employee hours, such as to balance revenue and overhead costs.

Other applications relate to natural disasters, such as wildfires and hurricanes, for example. More particularly, smoke and clouds prevent aerial sensor collection, but on the ground sensors from smart-home appliances and from citizen and police/firefighter cell-phones can report impending wildfire weather approaching. For instance, if the smart-devices stop sending information just after sensor data showed increasing temperature and/or wind, authorities would know that the power went out or that the fire reached that neighborhood. In this regard it may give an early warning for evacuation and fire fighters to reach that area. A similar scenario may be applicable for hurricanes, and may include other sensor information (e.g., water damage can be reported, etc.).

Still other examples related to event management (e.g., sports, concerts, conferences, festivals, etc.). For example, the system 30 may allow for planning for security before and during an event by monitoring every device approaching, near, in, or leaving a facility. Another use case is planning temporary infrastructure (e.g., portable bathrooms, water, parking, traffic control, housing, etc.)

Other example applications related to connected cities. For example, these may include road and railway planning, infrastructure planning (e.g., electric power, water, sewer, right-aways, parks, etc.). The system 30 may also be used for social services planning (e.g., such as for hospitals, schools, police, firefighters, etc.), as well as agricultural/farm planning. Still another example applications include stock price analysis, where business can be characterized by increase or decrees in activity associated with commercial delivery; change in distance of deliveries with expanding territory for a wholesale food distributer; or change in consumer activity at a given retailer or restaurant.

The system 30 may accordingly provide numerous benefits. In terms of timeline, it may provide a continuous persistent 24/7 data collection capturing all (ab)normal site activity. Moreover, normalcy models may be created within a very short period of time (e.g., one week) for quick react activity based intelligence applications, as compared with conventional normalcy model approaches which typically take 6 months to a year to build. Another significant advantage is cost savings, which will be appreciated based upon a simple cost comparison of one hour of aerial or space imagery to a persistent CSMD stream for the same period. In terms of cost-effectiveness, it may provide 24/7 real-time automated facility monitoring change detection and can recommend specific sites for aerial inspection follow up, thus conserving constrained aerial resources for pre-selected sites of high interest (i.e., a "tip and queue" approach with other sensors).

Still another significant advantage of the system 30 is that no training data is required, as the processing chain ingests and models real-time unsupervised data. Furthermore, the system 30 may also advantageously provide a periodic truth baseline, allowing for fusion of patterns of life MULTI-INT data (e.g., WAMI, FSV) for checks and balances of truth baseline to minimize bias and to neutralize misleading information at desired intervals (e.g., six months, one year, etc.).

Figure 11:
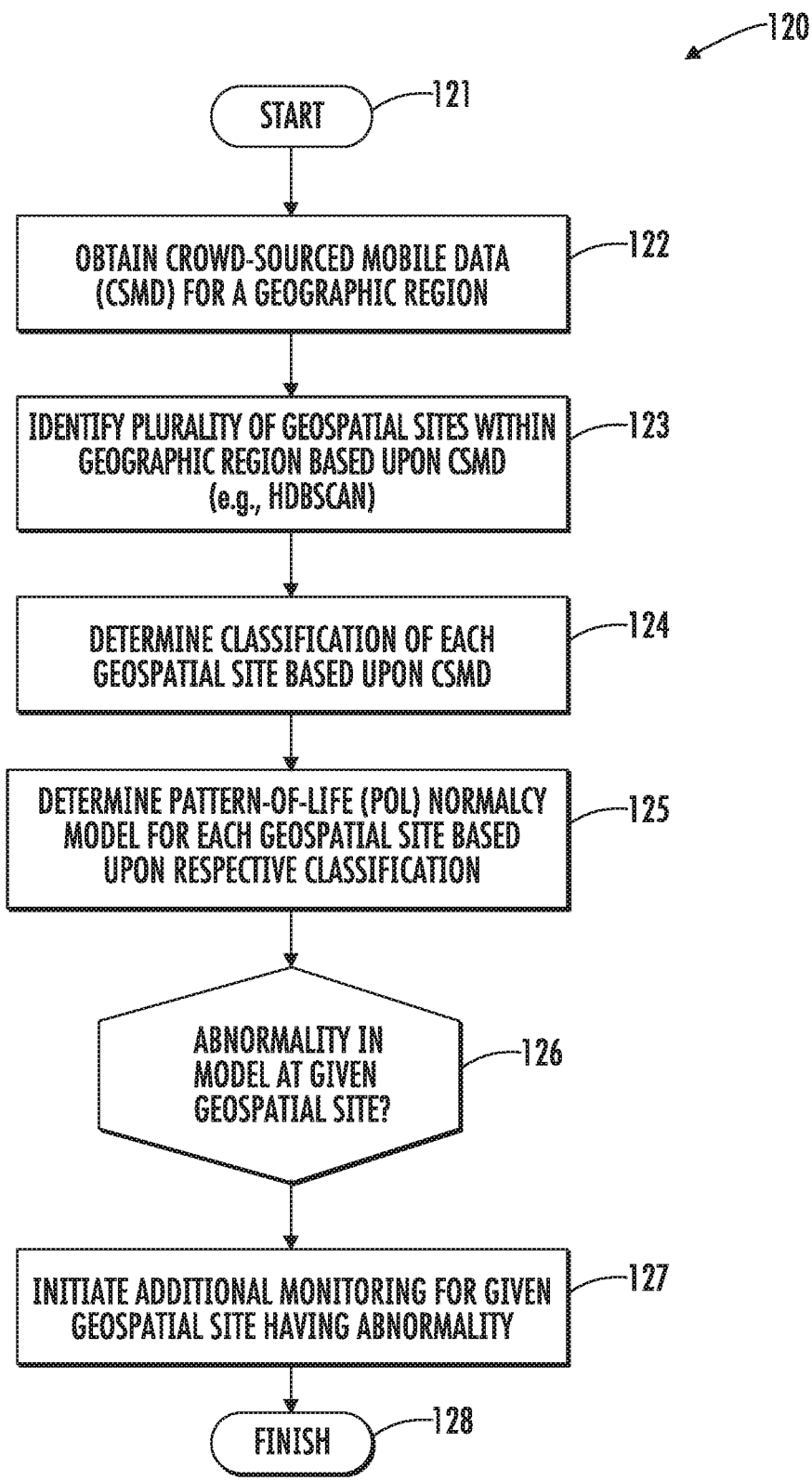
FIG. 11 is a flow diagram illustrating method aspects associated with the system of FIG. 1 in accordance with an example embodiment.

Turning now to the flow diagram 120 of FIG. 11, a related geospatial monitoring method is now described. Beginning at Block 121, the method illustratively includes obtaining CSMD for a geographic region of interest at the server 33 (Block 122), and identifying a plurality of geospatial sites within the geographic region based upon the CSMD at the server (Block 123). The method further illustratively includes determining a classification of each of the plurality of geospatial sites at the server 33 based upon the CSMD, at Block 114, and determining a pattern-of-life normalcy model for each of the geospatial sites at the server based upon a respective classification, at Block 125. Upon the determination of an abnormality in a respective pattern-of-life normalcy model at a given geospatial site based upon the CSMD, at Block 126, the method may further include initiating additional monitoring for the given geospatial site having the abnormality, at Block 127, as discussed further above. The method of FIG. 11 illustratively concludes at Block 128. It should be noted that, in some implementations, in addition to initiating additional monitoring the normalcy of a given location may be updated based on recent trends. That is, the additional monitoring may provide a basis for characterizing the changes—what changed, and why—such that the normalcy model may be updated appropriately.

More particularly, referring again to FIGS. 2A-2B, the example processing chain utilized by the system 30 may include a first step of site identification coarse-grained (Block 48) via density based clustering (Block 55) through unsupervised hierarchical density-based spatial clustering of applications with noise algorithm that assigns site ID labels, while excluding outlying trip observations. The second step is site identification fine-grained (Block 49) including polygon geometry division (Block 56) via unsupervised coarse-grained clustering that is refined with polygon geometry division via independent feature variables to further subdivide identified site clusters, if desired.

Furthermore, the third step is site classification coarse-grained (Block 50) that is provided through probabilistic partitioning (Block 57) via unsupervised partitioning algorithm, which assigns site type labels to trip observations. The fourth step is site classification fine-grained (Block 51), which includes various components. Auto-generated site type labels for each trip observation may be repurposed. Site classification may be provided by trip variants using a Deep Neural Network that employs the image variant method of image classification to classify Site Types from trip observation variants associated with each Site ID. Furthermore, deep neural network hidden layers processing (Block 58) may be provided based upon the number of layers and specific activation functions to increase accuracy and/or reduce size. Furthermore, parameter dimensionality reduction may be provided for reducing the number of Deep Learning parameters (weights, bias) which reduces the size while increasing the performance of the algorithms (FPGA friendly, timely results). Finally, behavior segmentation may be performed via a normalcy behavior model based on market segmentation with feature vote summations.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A geospatial monitoring system comprising:
a memory and a processor cooperating with the memory to
obtain crowd-sourced mobile data (CSMD) for a geographic region including vehicle data points,
identify a plurality of geospatial sites within the geographic region based upon the CSMD based upon grouping of vehicle data points corresponding to starting and ending of trips using a hierarchical density-based spatial clustering of applications with noise (HDBSCAN) algorithm,
separate vehicle data points associated with respective sites into consumer and business vehicle data points,
determine a classification of each of the plurality of geospatial sites based upon trip observations associated with the consumer vehicle data points and the business vehicle data points associated with the site,
determine a pattern-of-life normalcy model for each of the geospatial sites based upon a respective classification,
determine an abnormality in a respective pattern-of-life normalcy model at a given geospatial site based upon the CSMD, and
initiate additional monitoring for the given geospatial site having the abnormality.

2. The system of claim 1 wherein the processor identifies the plurality of geospatial sites without training data.

3. The system of claim 1 wherein the processor determines the classification of each of the plurality of geospatial sites based upon an unsupervised partitioning algorithm.

4. The system of claim 1 wherein the processor is configured to identify the plurality of geospatial sites within the geographic region based upon unsupervised density based geospatial clustering of CSMD data points, and unsupervised geometric boundary generation for respective clustered data points.

5. The system of claim 4 wherein the processor is configured to selectively perform unsupervised geometry boundary division for geospatial sites having different types of CSMD data points therein.

6. The system of claim 1 wherein the CSMD further comprises at least one of social media data points and mobile phone data points.

7. The system of claim 1 wherein the processor is configured to determine the classification of each of the plurality of geospatial sites based upon deep learning.

8. A geospatial monitoring method comprising:
obtaining crowd-sourced mobile data (CSMD) for a geographic region including vehicle data points at a server;
identifying a plurality of geospatial sites within the geographic region based upon the CSMD at the server based upon grouping of vehicle data points corresponding to starting and ending of trips using a hierarchical density-based spatial clustering of applications with noise (HDBSCAN) algorithm;
separating vehicle data points associated with respective sites into consumer and business vehicle data points;
determining a classification of each of the plurality of geospatial sites at the server based upon trip observations associated with the CSMD;
determining a pattern-of-life normalcy model for each of the geospatial sites at the server based upon a respective classification;
determining an abnormality in a respective pattern-of-life normalcy model at a given geospatial site at the server based upon the consumer vehicle data points and the business vehicle data points associated with the site; and
initiating additional monitoring at the server for the given geospatial site having the abnormality.

9. The method of claim 8 wherein identifying comprises identifying the plurality of geospatial sites without training data.

10. The method of claim 8 wherein determining the classification comprises determining the classification of each of the plurality of geospatial sites based upon an unsupervised partitioning algorithm.

11. The method of claim 8 wherein identifying comprises identifying the plurality of geospatial sites based upon unsupervised density based geospatial clustering of CSMD data points, and unsupervised geometric boundary generation for respective clustered data points.

12. The method of claim 11 wherein identifying further comprises selectively performing unsupervised geometry boundary division for geospatial sites having different types of CSMD data points therein.

13. A non-transitory computer-readable medium having computer-executable instructions for causing a computer to perform steps comprising:
obtaining crowd-sourced mobile data (CSMD) for a geographic region including vehicle data points;
identifying a plurality of geospatial sites within the geographic region based upon the CSMD based upon grouping of vehicle data points corresponding to starting and ending of trips using a hierarchical density-based spatial clustering of applications with noise (HDBSCAN) algorithm;
separating vehicle data points associated with respective sites into consumer and business vehicle data points;
determining a classification of each of the plurality of geospatial sites based upon trip observations associated with the consumer vehicle data points and the business vehicle data points associated with the site;

determining a pattern-of-life normalcy model for each of the geospatial sites based upon a respective classification;

determining an abnormality in a respective pattern-of-life normalcy model at a given geospatial site based upon the CSMD; and initiating additional monitoring for the given geospatial site having the abnormality.

14. The non-transitory computer-readable medium of claim 13 wherein identifying comprises identifying the plurality of geospatial sites without training data.

15. The non-transitory computer-readable medium of claim 13 wherein determining the classification comprises determining the classification of each of the plurality of geospatial sites based upon an unsupervised partitioning algorithm.

16. The non-transitory computer-readable medium of claim 13 wherein identifying comprises identifying the plurality of geospatial sites based upon unsupervised density based geospatial clustering of CSMD data points, and unsupervised geometric boundary generation for respective clustered data points.

17. The non-transitory computer-readable medium of claim 16 wherein identifying further comprises selectively performing unsupervised geometry boundary division for geospatial sites having different types of CSMD data points therein.

* * * * *